(12) United States Patent
Chiu et al.

(10) Patent No.: US 8,230,123 B2
(45) Date of Patent: Jul. 24, 2012

(54) USING INFORMATION ON INPUT/OUTPUT (I/O) SIZES OF ACCESSES TO AN EXTENT TO DETERMINE A TYPE OF STORAGE DEVICE FOR THE EXTENT

(75) Inventors: Lawrence Yiumchee Chiu, San Jose, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/861,756

(22) Filed: Aug. 23, 2010

(65) Prior Publication Data
US 2012/0047287 A1 Feb. 23, 2012

(51) Int. Cl.
*G06F 3/00* (2006.01)
(52) U.S. Cl. .......................................... 710/8; 714/47.1
(58) Field of Classification Search .................. None
See application file for complete search history.

(56) References Cited

U.S. PATENT DOCUMENTS

| | | | |
|---|---|---|---|
| 6,324,620 B1 | 11/2001 | Christenson et al. | |
| 6,732,241 B2 * | 5/2004 | Riedel | 711/154 |
| 7,054,790 B1 * | 5/2006 | Rich | 702/186 |
| 7,275,097 B2 | 9/2007 | Peake, Jr. et al. | |
| 7,356,660 B2 * | 4/2008 | Matsunami et al. | 711/165 |
| 7,502,904 B2 * | 3/2009 | Furuhashi et al. | 711/165 |
| 7,631,023 B1 * | 12/2009 | Kaiser et al. | 1/1 |
| 2007/0239806 A1 * | 10/2007 | Glover | 707/204 |
| 2008/0092122 A1 | 4/2008 | Caprihan et al. | |
| 2009/0144393 A1 * | 6/2009 | Kudo | 709/218 |
| 2011/0145489 A1 * | 6/2011 | Yu et al. | 711/103 |

* cited by examiner

*Primary Examiner* — Elias Mamo
(74) *Attorney, Agent, or Firm* — David W. Victor; Konrad Raynes & Victor LLP (57) ABSTRACT

Provided are a method, system, and computer program product for using information on Input/Output (I/O) sizes of accesses to an extent to determine a type of storage device for the extent from a plurality of storage devices comprising at least one of a first storage type and a second storage type. Performance information is processed for a time period for Input/Output (I/O) operations with respect to an extent maintained in at least one of the storage devices of the first storage type, wherein the performance information indicates an I/O size of the I/O operations with respect to the extent. A determination is made as to whether characteristics of the I/O operations other than I/O size indicate that the extent is eligible for migration to at least one of the storage devices of the second storage type. A determination is made as to whether characteristics of the I/O sizes of the I/O operations. A determination is made as to whether the characteristics of the I/O sizes of the I/O operations indicate that the extent should be migrated from the at least one storage device of the first storage type to at least one of the storage devices of the second storage type. The extent is migrated from one of the storage devices of the first type to at least one of the storage devices of the second type in response in response to determining that the extent is eligible for migration and that the characteristics of the I/O sizes indicate that the extent should be migrated.

23 Claims, 7 Drawing Sheets

Extent I/O Statistics

FIG. 1

Extent Information

FIG. 2

Extent I/O Statistics

USING INFORMATION ON INPUT/OUTPUT (I/O) SIZES OF ACCESSES TO AN EXTENT TO DETERMINE A TYPE OF STORAGE DEVICE FOR THE EXTENT

BACKGROUND OF THE INVENTION

1. Field of the Invention

The present invention relates to a method, system, and computer program product for using information on Input/Output (I/O) sizes of accesses to an extent to determine a type of storage device for the extent.

2. Description of the Related Art

To improve storage performance, extents of tracks may be migrated between different types of storage devices, such as hard disk drives, solid state storage devices, etc., depending on the characteristics of the Input/Output (I/O) requests directed to the extent. For instance, more frequently accessed extents and/or higher priority extents may be migrated to a faster access, low latency storage device, such as a Solid State Storage Device (SSD), from a slower access, high latency storage device, such as a hard disk drives (HDD). Further, less frequently accessed extents and/or lower priority extents may be migrated from a higher performance, low latency storage device to a lower performance, high latency storage device.

There is a need in the art for improved techniques for determining when to migrate an extent between different types of storage devices depending on a variety of characteristics specific to the types of the storage devices.

SUMMARY

Provided are a method, system, and computer program product for using information on Input/Output (I/O) sizes of accesses to an extent to determine a type of storage device for the extent from a plurality of storage devices comprising at least one of a first storage type and a second storage type. Performance information is processed for a time period for Input/Output (I/O) operations with respect to an extent maintained in at least one of the storage devices of the first storage type, wherein the performance information indicates an I/O size of the I/O operations with respect to the extent. A determination is made as to whether characteristics of the I/O operations other than I/O size indicate that the extent is eligible for migration to at least one of the storage devices of the second storage type. A determination is made as to whether characteristics of the I/O sizes of the I/O operations. A determination is made as to whether the characteristics of the I/O sizes of the I/O operations indicate that the extent should be migrated from the at least one storage device of the first storage type to at least one of the storage devices of the second storage type. The extent is migrated from one of the storage devices of the first type to at least one of the storage devices of the second type in response in response to determining that the extent is eligible for migration and that the characteristics of the I/O sizes indicate that the extent should be migrated.

DETAILED DESCRIPTION

Figure 1:
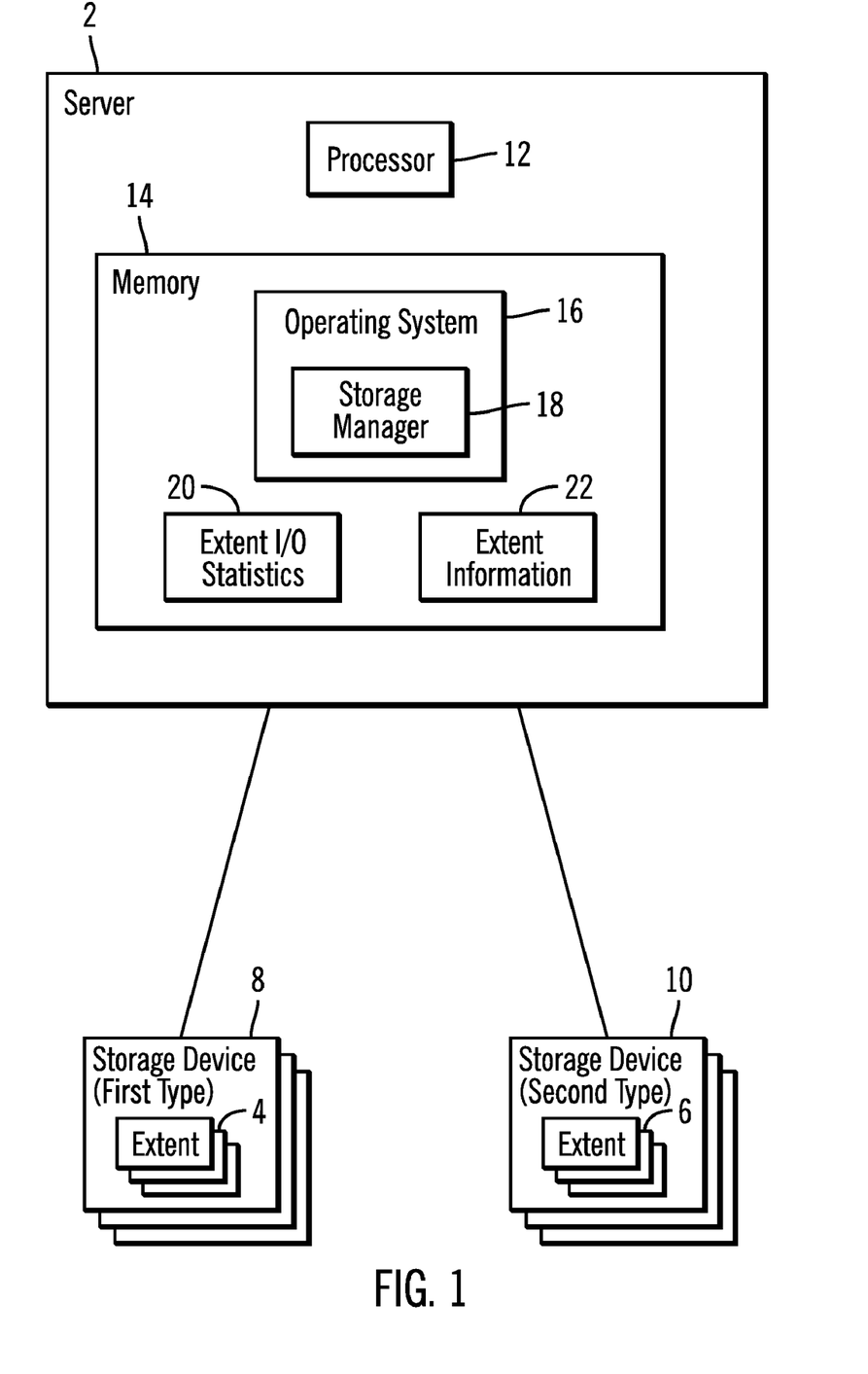
FIG. 1 illustrates an embodiment of a computing environment.

FIG. 1 illustrates an embodiment of a server 2 managing extents 4, 6 of data in storage devices 8 of a first type and storage devices 10 of a second type. Devices 8 of the first type may comprise low latency devices, such as Solid State Storage (SSD) devices, that have lower bandwidth as the size of the data subject to the Input/Output (I/O) (i.e., read and write) operations increases. Storage devices 10 of the second type may comprise higher latency devices with respect to the latency of the devices 8, such as magnetic hard disk drives. Although the storage devices 8 of the first type may provide higher performance and lower latency, in certain embodiments, as the size of the I/O requests increases to the storage devices 8 of the first type, the bandwidth of the storage devices 8 may fall below the bandwidth of the storage devices 10 of the second type.

The server 2 includes a processor 12 comprising one or more processor devices and a memory 14 in which an operating system 16 is loaded to be executed by the processor 12. The operating system 16 includes a storage manager 18 to manage the migration of an extent of tracks to different types of storage devices to optimize I/O performance. Extent I/O statistics 20 comprise gathered performance information on I/O requests for a measurement time period and the extent information 22 includes extent metadata on the current storage device 8, 10 storing the extent. The extent information 22 may provide a mapping of extent blocks to locations in one or more storage devices 8, 10. A data set or logical volume is composed of extents, which comprises a grouping of tracks or blocks of data.

The server 2 may communicate with the first 8 and second 10 storage devices over a network, via separate cables through a storage interface, a bus interface, in a loop architecture, etc. The first 8 and second 10 storage devices may comprise different types of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storage devices 8, 10 may be stored in one or more enclosures. The memory 14 may comprise one or more volatile or non-volatile memory devices. The storage manager code 18 may alternatively be implemented as application code external to the operating system 16 or may be implemented with hardware logic, such as an Application Specific Integrated Circuit (ASIC), or as a programmable processor executing code in a computer readable storage medium.

In one embodiment, the first 8 and second 10 storage devices may be grouped into storage device type groups in a hierarchical arrangement of storage devices, where tiers define storage based on characteristics such as speed of their I/O access profile, redundancy, etc. For instance, the storage device 8 type may comprise a high speed storage, such as an SSD or RAM drive, and the storage device 10 type may comprise a slower access storage, such as a hard disk drive or tape medium. The operating system 16 may call the storage manager code 14 to gather information on I/O statistics and determine extents that are not frequently accessed and/or having lower priority to migrate from first storage devices 8 to second storage devices 10 and migrate more frequently accessed and/or higher priority extents of tracks from the second storage devices 10 to the first storage devices 8.

In certain embodiments, an extent may comprise tracks or data blocks that are stored contiguously, which is advantageous in embodiments where the storage device may comprise a storage device that has improved read/write access for tracks stored contiguously in the media, such as a hard disk drive and a tape drive. However, the data for the tracks in the extent may not be contiguously stored in a low latency storage device, which may comprise a storage device that does not experience improved access for contiguously stored tracks, such as the case with a solid state storage device (SSD) or Random Access Memory (RAM) drive. An extent is an atomic unit of storage. Volumes may be striped across multiple devices, or stored redundantly. Individual extents can be on a single device or stored redundantly.

Figure 2:
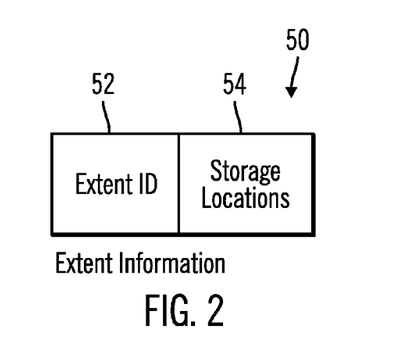
FIG. 2 illustrates an embodiment of an instance of extent information.

FIG. 2 illustrates an embodiment of extent information 50 for one extent included in the extent information 22. The extent information 50 for one extent 4, 6 may include an extent identifier (ID) 52 and storage locations 54 indicating the one or more storage devices 8, 10 including the extent and storage locations in the storage devices for the extent, such as track number, etc. The storage locations 54 may map blocks in the extent to blocks or locations in one or more storage devices 8, 10.

Figure 3:
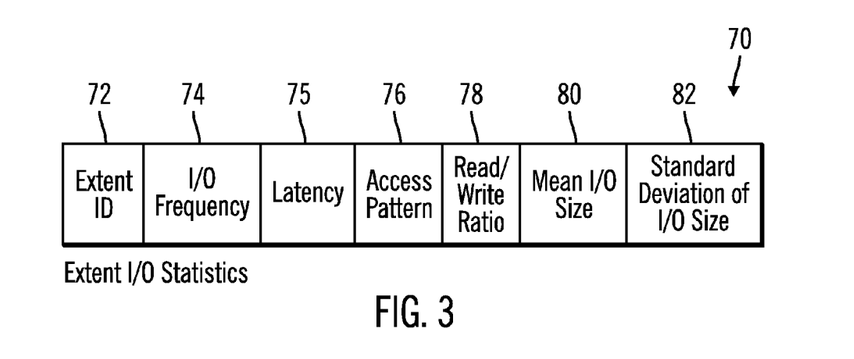
FIG. 3 illustrates an embodiment of an instance of extent I/O statistics.

FIG. 3 illustrates an embodiment of extent I/O statistics 70 comprising an instance of the extent I/O statistics 20 determined from information gathered for one extent during a measurement period. The extent I/O statistics 70 include an extent identifier (ID) 72 for which the information is gathered. The extent statistics for a measurement time period may include, but are not limited to, an I/O frequency 74 indicating the number of I/O requests per unit of time, such as per second; a latency 75 or response times for random and sequential read and write requests; an access pattern 76 indicating the number of random access and sequential access I/Os (which may be expressed as a ratio of random to sequential accesses); a read/write ratio 78 of read requests to write requests; a mean I/O size 80 of the I/O requests during the time period, and a standard deviation 82 of the I/O sizes.

Figure 4:
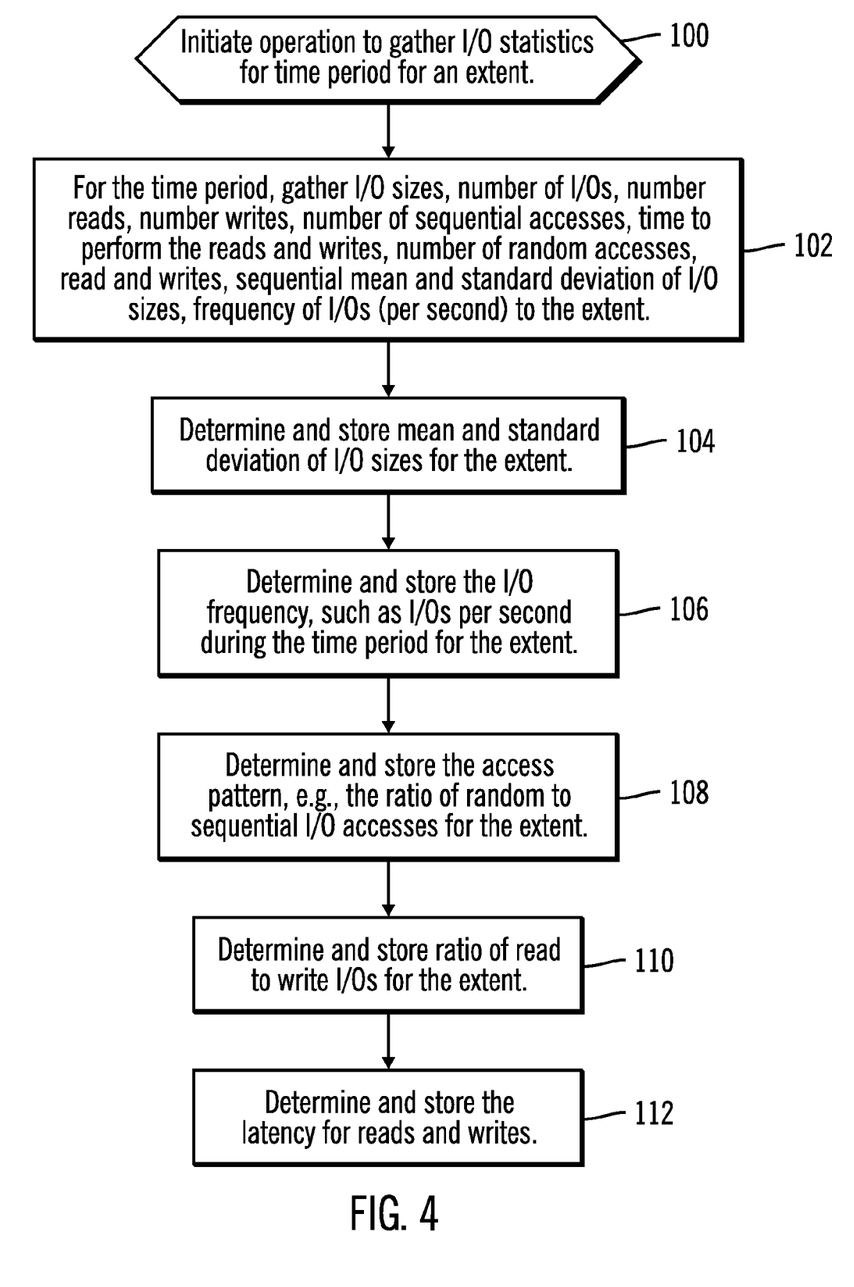
FIG. 4 illustrates an embodiment of operations to gather statistics for I/O accesses to an extent.

FIG. 4 illustrates an embodiment of operations performed by the storage manager 18 to gather extent I/O statistics 70 for an extent 4, 6. The operations of FIG. 4 may be performed during real time system operations to gather information based on actual I/O operations to allow the extents 4, 6 to be moved during real time operations to optimize real time performance. Upon initiating (at block 100) an operation to gather I/O statistics for a measurement time period for one extent 4, 6, the storage manager 18 gathers (at block 102) I/O sizes, number of I/Os, number reads, number writes, number of sequential accesses, number of random accesses, a number of reads and writes, time to perform the reads and writes. After the information is gathered, the storage manager 18 determines and stores (at block 104) the mean 80 and standard deviation 82 (FIG. 3) of the I/O sizes for I/Os directed to the extent; determines and stores (at block 106) the I/O frequency 74, which may be calculated as the I/Os per second to the extent 4, 6 during the time period; determines and stores (at block 108) the access pattern 76, which may be calculated as a ratio of random to sequential I/O accesses to the extent 4, 6 during the time period; and determines and stores (at block 110) the ratio of read to write I/Os 78 to the extent 4, 6. The storage manager 18 would further determine and store (at block 112) the latency 75 for reads and writes comprising the delay or time to perform the requested read and write operations, which may comprise an average of the latencies for reads and writes.

FIG. 5-8 illustrate an embodiment of operations performed by the storage manager 18 to use the gathered extent I/O statistics 70 for the extent 4, 6 to determine whether the extent needs to be migrated from the current one or more storage devices 8, of a particular type, e.g., high or low latency, to a different type of one or more storage devices 8, 10. For purposes of this discussion, storage devices 8 are described as the low latency, higher performance storage device, e.g., SSD, and storage devices 10 are described as the high latency, lower performance storage device, e.g., HDD. However, under certain operating circumstances, such as larger I/O size, sequential accesses, predominantly write accesses, the storage devices 8 may provide lower performance than the storage devices 10. Upon initiating (at block 150) the operation to determine whether to migrate the extent 4, 6 to a different type storage device 8, 10, if (at block 152) the current storage device 10 is a high latency device, e.g., a hard disk drive (HDD), then the storage manager 18 determines (at block 156) whether characteristics of the I/O operations other than I/O size indicate that the extent 6 is eligible for migration to a low latency device. Such characteristics other than I/O size may comprise the I/O frequency, i.e., whether the extent is "hot", the access pattern, i.e., predominantly random or sequential accesses, and whether the I/O operations are predominantly reads or writes. In certain embodiments, one or more of the observations of a relatively higher I/O frequency, random access pattern and predominance of read operations may indicate that the extent is eligible to be migrated from one or more high latency storage devices, such as one or more hard disk drives (HDDs), to a low latency storage device, such as one or more SSDs. SSDs provide better performance over hard disk drives for more frequently accessed extents 6 due to their low latency and provide better performance for randomly accessed extents because they do not have the disk seek time delays experienced by hard disk drives. However, if writes are more predominant, then hard disk drives are preferred because SSDs degrade as a result of write operations, where hard disk drives do not experience such write degradation. Further, for sequential access and larger I/O sizes, the higher latency storage device 10 may provide better or more equivalent performance.

Figure 5:
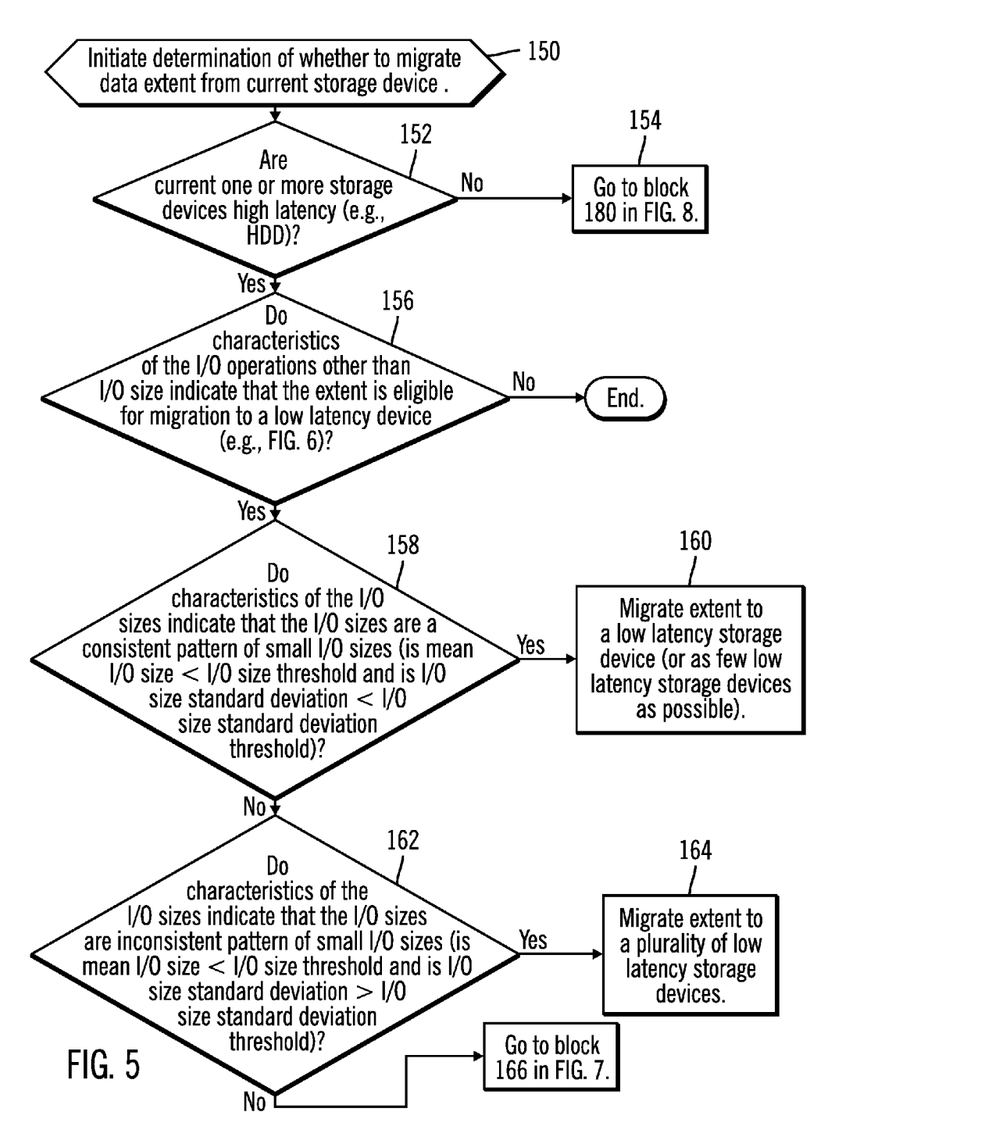
FIGS. 5-8 illustrate an embodiment of operations to determine whether to migrate an extent from one storage device type to another.
Figure 6:
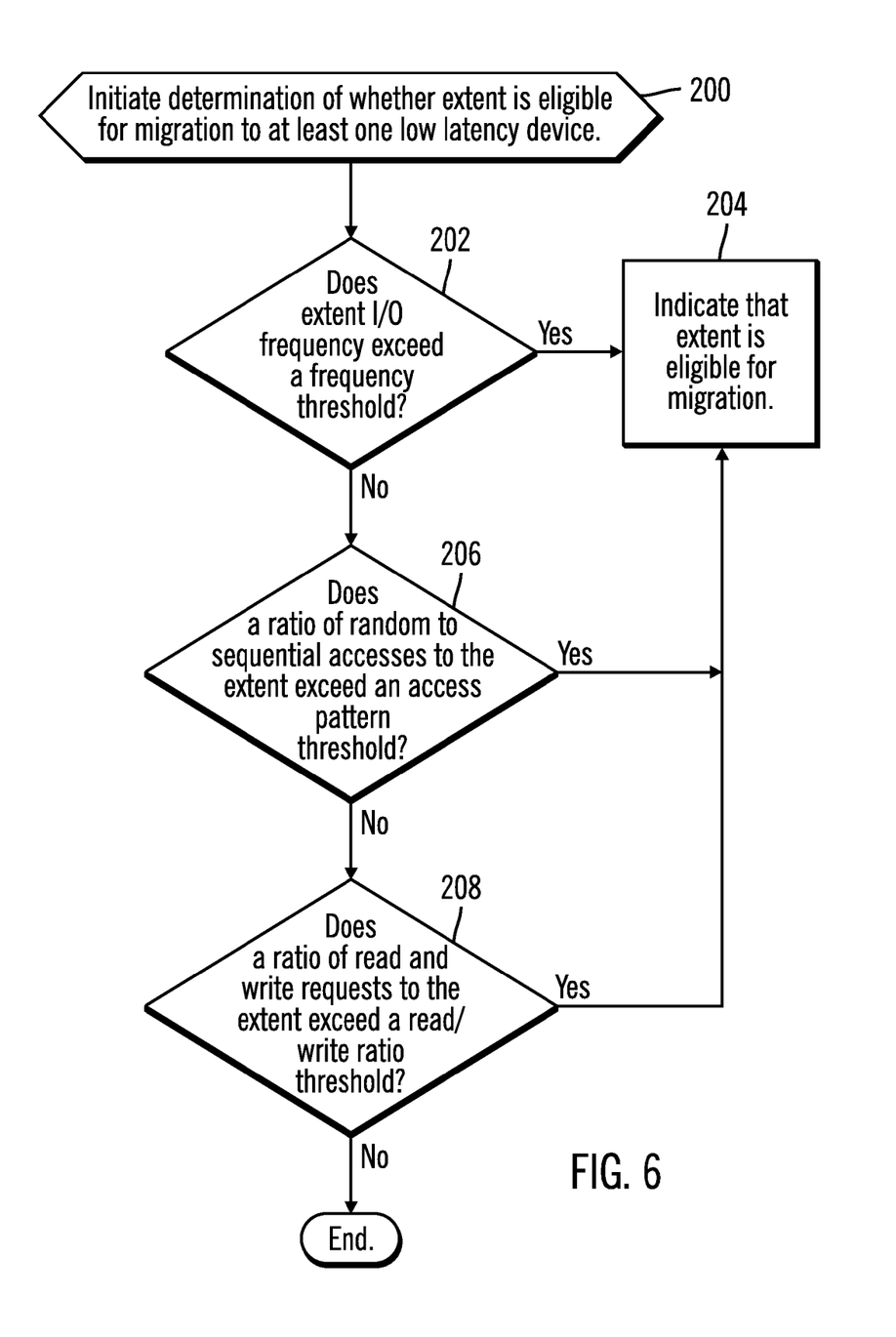

FIG. 6 illustrates an embodiment of operations the storage manager 18 performs at block 156 in FIG. 5 to determine whether the extent 6 is eligible for migration to a lower latency device, e.g., one or more of the storage devices 8. Upon initiating (at block 200) the eligibility determination, the storage manager 18 determines whether the extent I/O frequency 74 exceeds a frequency threshold. If so, then the storage manager 18 indicates (at block 204) that the extent 6 is eligible for migration. Otherwise, if (from the No branch of block 202) the measured I/O frequency 74 does not exceed the threshold, then the extent is still indicated as eligible for migration (at block 204) in response to determining (at block 206) that a ratio of random to sequential accesses, indicated in the access pattern field 76 (FIG. 3), exceed an access pattern threshold. If (from the No branch of block 206) the ratio of random to sequential accesses 76 does not exceed the threshold, then the extent is still indicated as eligible for migration (at block 204) in response to determining (at block 208) that a ratio of read to writes 78 (FIG. 3) exceeds a read/write threshold.

In the embodiment of FIG. 6, any one of the determinations results in a determination of eligibility for migration from the high to low latency storage. However, in alternative embodiments, multiple of the tests at blocks 202, 206, and 208, or additional tests, may need to satisfy the threshold in order for the extent to be deemed eligible for migration from the high 10 to low 8 latency storage.

With respect to FIG. 5, if (at block 156) the extent 6 is not eligible for migration based on characteristics of I/O operations other than I/O size, then control ends without migration. Otherwise, if the extent 6 is eligible (from the Yes branch of block 156), then the storage manager 18 begins a series of operations at blocks 158-170 in FIGS. 5 and 7 to classify the extent 6 according to characteristics of the I/O sizes of the measured I/O operations, such as the mean I/O size 80 and I/O size standard deviation 82. The I/O size classification as consistent or inconsistent and small or large I/O sizes determines how and whether to migrate the extent 6. If (at block 158) the characteristics of the I/O sizes indicate that the I/O sizes are a consistent pattern of small I/O sizes, then the storage manager 18 indicates to migrate (at block 160) the extent to a low latency storage device or as few low latency storage devices as possible because, in certain embodiments, the low latency storage device 8, such as an SSD, may provide higher performance for handling relatively smaller I/Os. A consistent pattern of small I/O sizes may be determined if the mean I/O size 80 is less than (or less than or equal to) an I/O size threshold and the I/O size standard deviation 82 is less than (or less than or equal to) an I/O size standard deviation threshold.

If (at block 162) the characteristics of the I/O sizes indicate that the I/O sizes are an inconsistent pattern of small I/O sizes, such as mostly small I/O sizes with peaks of occasionally large I/O sizes, then the storage manager 18 may indicate (at block 164) to migrate the extent 6 to a plurality of low latency storage devices 8 to allow the extent 6 to be load balanced across multiple storage devices to provide improved performance for the occasional I/O requests having higher I/O sizes. The number of devices required for load-balancing can be reduced by using time-correlation of I/O peaks to pack more extents into the same device. An inconsistent pattern of small I/O sizes may be determined if the mean I/O size 80 is less than (or less than or equal to) the I/O size threshold and if the I/O size standard deviation 82 is greater than (or greater than or equal to) the I/O size standard deviation threshold.

Figure 7:
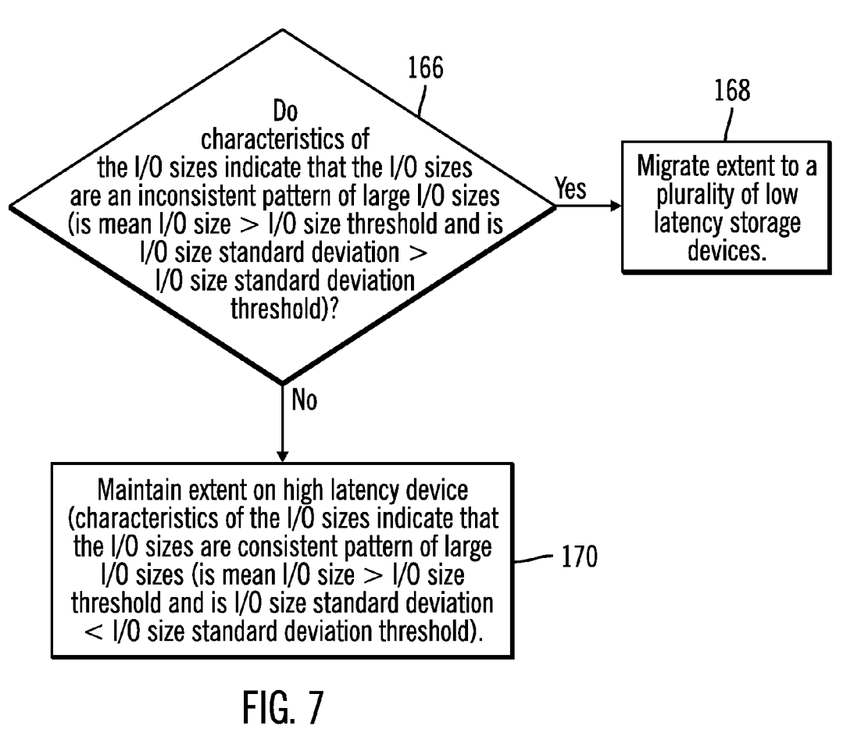

If (at block 162) the characteristics of the I/O sizes do not indicate that the I/O sizes are an inconsistent pattern of small I/O sizes, then with respect to FIG. 7, if (at block 166) the characteristics of the I/O sizes indicate that the I/O sizes are an inconsistent pattern of large I/O sizes than the storage manage 14 may migrate (at block 168) the extent 6 to a plurality of low latency storage devices 8. The extent may be load balanced across multiple devices to handle the greater number of larger I/O size requests. An inconsistent pattern of large I/O sizes may be determined if the mean I/O size 80 is greater than (or greater than or equal to) the I/O size threshold and if the I/O size standard deviation 82 is greater than (or greater than or equal to) the I/O size standard deviation threshold. Alternatively, if I/O sizes are large, then the storage manager 14 may leave the extent 4, 6 on the higher latency device, which in certain embodiments, provides higher or more equivalent performance for I/O requests having larger I/O sizes.

If (from the No branch of block 166) the characteristics of the I/O sizes indicate that the I/O sizes are a consistent pattern of large I/O sizes, then the storage manager 18 determines to maintain (at block 170) the extent on the current one or more high latency storage devices 10 storing the extent. A consistent pattern of large I/O sizes may be determined if the mean I/O size is greater than (or greater than or equal to) the I/O size threshold and the I/O size standard deviation 82 is less than (or less than or equal to) the I/O size standard deviation threshold. Moreover, in alternative embodiments, instead of mean and standard deviation, similar measures (or other derived measures) may be used, such as exponential moving averages (EMA, MA), median, mode instead of mean and other measures of variability such as variance, dispersion, expected deviation, etc.

Figure 8:
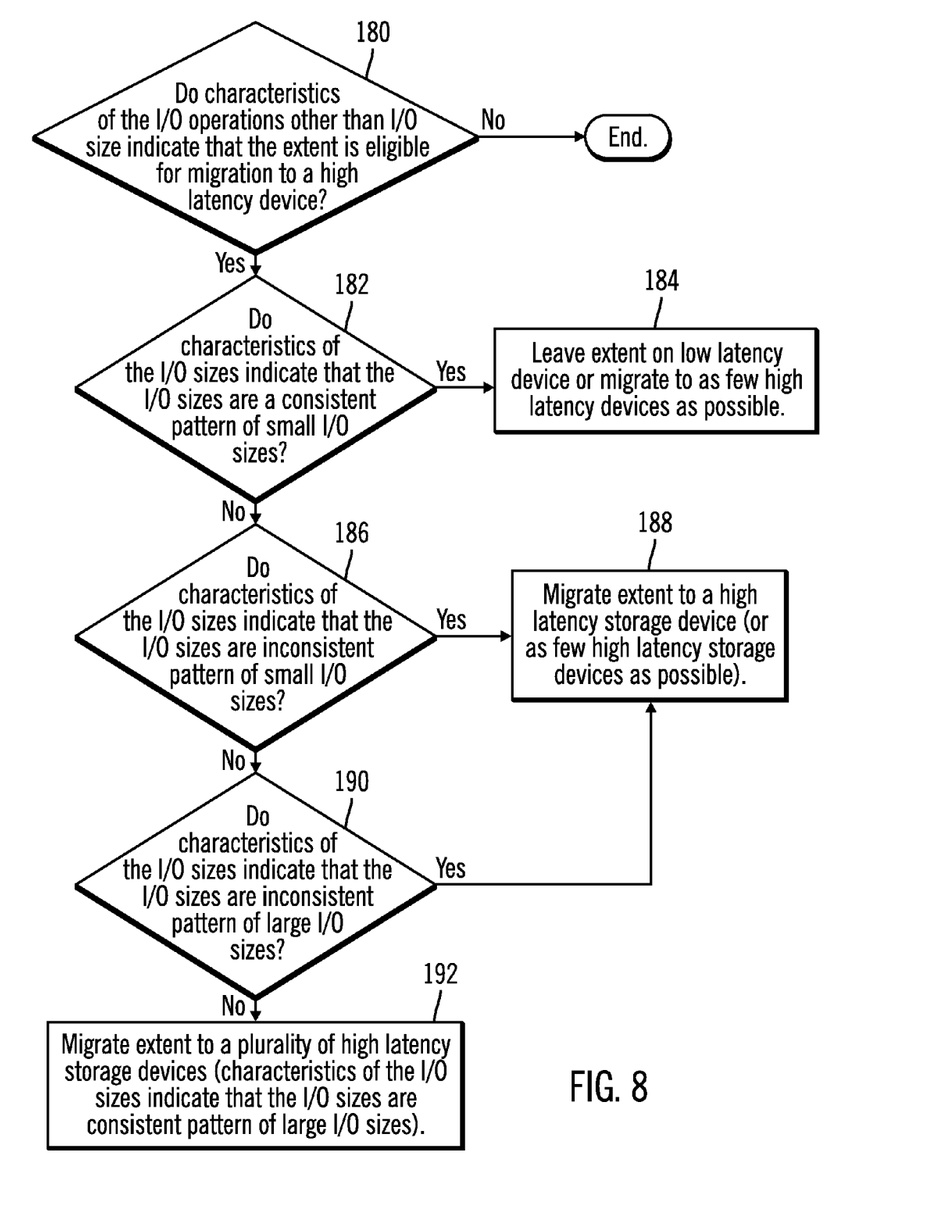

With respect to FIG. 5, if (at block 152) the current one or more storage devices 8 storing the extent 4, are higher performance, low latency (e.g., SSD), then control proceeds (at block 154) to block 180 in FIG. 8 to determine whether to migrate the extent 4 to one or more high latency storage devices 10, e.g., hard disk drives. The storage manager 18 performs the operations at blocks 180 to 192 to determine whether the extent 4 is eligible for migration based on non-I/O size related characteristics and the classification of the I/O size as having consistent or inconsistent and small or large I/O sizes. At block 180, the storage manager 18 may determine whether the extent is eligible for migration to the higher latency device 10 based on non-I/O size characteristics, such as the I/O frequency, access pattern and read/write ratio. In one embodiment, one or more characteristics indicating a relatively lower I/O frequency, a sequential access pattern, and a predominantly greater number of writes may indicate eligibility for migration from the low latency device 8, such as an SSD, which may not perform as well based on such non-I/O size characteristics, to a higher latency device 10, such as a hard disk drive, which may provide better performance under such conditions. If (at block 180) the extent is not eligible for migration, then control ends. If the extent 4 is eligible (from the Yes branch of block 180), then the storage manager 18 performs the operations at block 182-192 to classify the I/O size for the extent 4 to determine whether to migrate.

If (at block 182) the characteristics of the I/O sizes, such as the mean 80 and standard deviation 82, indicate that the I/O sizes are a consistent pattern of small I/O sizes, then the extent is retained (at block 184) in the low latency device 8, which provides better performance for small I/O sizes, or may be migrated to as few high latency devices as possible. If (at block 186) the characteristics of the I/O sizes indicate that the I/O sizes are an inconsistent pattern of small I/O sizes, then the storage manager 18 may migrate (at block 188) the extent 4 to a high latency device 10 or as few high latency devices as possible. Alternatively, the storage manager 18 may leave the extent 4 on the low latency device 8 for inconsistent small I/O sizes. If (at block 190) the characteristics of the I/O sizes indicate that the I/O sizes are an inconsistent pattern of large I/O sizes, then the storage manager 18 may migrate (at block 188) the extent 4 to a high latency device 10 or as few high latency devices 10 as possible. Alternatively, the storage manager 18 may leave the extent 4 on the low latency device 10 for inconsistent small I/O sizes. If (from the No branch of block 190) the characteristics of the I/O sizes indicate that the I/O sizes are a consistent pattern of large I/O sizes, then the storage manager 18 may migrate (at block 192) the extent 4 to a plurality of high latency storage devices 10 which provide better or more equivalent performance for larger size I/Os.

In the described embodiments, the storage manager 18 classifies extents according to the determined I/O size category of the accesses during the measurement period, which may be determined according to the mean and standard deviation of the I/O. This classification is used to determine bottlenecks in the system and whether migration would optimize I/O performance by transferring the extent to a storage device type better suited for handling the extent based on the I/O size classification, consistent or inconsistent and small or large I/O sizes. In certain embodiments, the statistics may be gathered at regular intervals to determine whether migration is required during such intervals that may occur during real time operations.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the server of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the server of FIG. 1 may provide clients, and other servers and software and/or hardware components in the networked cloud, with storage and data processing services. The server 2 may provide reliable storage services and access to the storages 8, 10 to meet quality of service requirements for customers in the cloud, including clients requiring storage and other servers providing storage services to clients. The server 2 may communicate with clients to provide storage services for the storages 8 and 10 through a web interface or other application programming interface.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for managing data in a plurality of storage devices comprising at least one of a first storage type and a second storage type, the computer program product comprising a computer readable storage medium having computer readable program code embodied therein that executes to perform operations, the operations comprising:

processing performance information for a time period for Input/Output (I/O) operations with respect to an extent maintained in at least one of the storage devices of the first storage type, wherein the performance information indicates I/O sizes of data subject to the I/O operations with respect to the extent;

determining whether characteristics of the I/O operations other than the I/O sizes indicate that the extent is eligible for migration to at least one of the storage devices of the second storage type;

determining characteristics of the I/O sizes of the I/O operations;

determining whether the characteristics of the I/O sizes of the I/O operations indicate that the extent should be migrated from the at least one storage device of the first storage type to at least one of the storage devices of the second storage type; and migrating the extent from one of the storage devices of the first type to at least one of the storage devices of the second type in response to determining that the extent is eligible for migration and that the characteristics of the I/O sizes indicate that the extent should be migrated.

2. The computer program product of claim 1, wherein the determining of the characteristics of the I/O sizes is performed in response to determining that the extent is eligible for migration.

3. The computer program product of claim 1, wherein the determined characteristics of the I/O sizes includes a mean and a standard deviation of the I/O sizes, wherein both the mean and the standard deviation are compared to a mean threshold and a standard deviation threshold to determine whether to migrate the extent from the at least one storage device of the first storage type to the at least one storage device of the second storage type.

4. The computer program product of claim 1, wherein the second storage type is classified as having a lower latency than the first storage type.

5. The computer program product of claim 4, wherein the determining of whether the characteristics of the I/O operations other than the I/O sizes used to determine whether the extent is eligible for migration to at least one of the storage devices of the second type comprises determining at least one of:

determining whether a frequency of the I/O operations to the extent exceeds a frequency threshold, wherein the extent is eligible for migration to at least one of the storage devices of the second type in response to determining that the frequency of I/O operations exceeds the frequency threshold;

determining whether a ratio of random to sequential accesses to the extent exceeds an access pattern threshold, wherein the extent is eligible for migration to at least one of the storage devices of the second type in response to determining that the ratio of random to sequential accesses exceeds the access pattern threshold; and determining whether a ratio of read and write requests to the extent exceeds a read/write ratio threshold, wherein the extent is eligible for migration to at least one of the storage devices of the second type in response to determining that the ratio of read to write requests exceeds the read/write threshold.

6. The computer program product of claim 4, wherein the characteristics of the I/O sizes are determined to indicate that the extent should be migrated in response to determining that the characteristics of the I/O sizes indicate that the I/O sizes are a consistent pattern of small I/O sizes.

7. The computer program product of claim 6, wherein the characteristics of the I/O sizes are determined to indicate that the extent should be migrated in response to determining that the characteristics of the I/O sizes indicate that the I/O sizes are an inconsistent pattern of small I/O sizes.

8. The computer program product of claim 7, wherein the determining that the I/O sizes are the consistent pattern of small I/O sizes comprises determining that an I/O size mean is below an I/O size threshold and an I/O size standard deviation is below an I/O size standard deviation threshold, and wherein the determining that the I/O sizes are the inconsistent pattern of small I/O sizes comprises determining that the I/O size mean is below the I/O size threshold and the I/O size standard deviation is above the I/O size standard deviation threshold.

9. The computer program product of claim 6, wherein determining that the I/O sizes are the consistent pattern of large I/O sizes comprises determining that an I/O size mean is above an I/O size threshold and an I/O size standard deviation is below an I/O size standard deviation threshold, and wherein determining that the I/O sizes are the inconsistent pattern of the large I/O sizes comprises determining that the I/O size mean is above the I/O size threshold and the I/O size standard deviation is above the I/O size standard deviation threshold.

10. The computer program product of claim 4, wherein the characteristics of the I/O sizes are determined to indicate that the extent should be migrated in response to determining that the characteristics of the I/O sizes indicate that the I/O sizes are an inconsistent pattern of large I/O sizes and wherein the characteristics of the I/O sizes are determined to indicate that the extent should be retained in response to determining that the characteristics of the I/O sizes indicate that the I/O sizes are a consistent pattern of the large I/O sizes.

11. The computer program product of claim 1, wherein the second storage type is classified as having a higher latency than the first storage type.

12. The computer program product of claim 11, wherein the determining of whether the characteristics of the I/O operations other than the I/O size used to determine whether the extent is eligible for migration to at least one of the storage devices of the second type comprise determining at least one of:
determining whether a frequency of the I/O operations to the extent exceeds a frequency threshold, wherein the extent is eligible for migration to at least one of the storage devices of the second type in response to determining that the frequency of I/O operations is below the frequency threshold;
determining whether a ratio of random to sequential accesses to the extent exceeds an access pattern threshold, wherein the extent is eligible for migration to at least one of the storage devices of the second type in response to determining that the ratio of random to sequential accesses is below the access pattern threshold; and
determining whether a ratio of read and write requests to the extent exceeds a read/write ratio threshold, wherein the extent is eligible for migration to at least one of the storage devices of the second type in response to determining that the ratio of read/write requests.

13. The computer program product of claim 12, wherein the characteristics of the I/O sizes are determined to indicate that the extent should be migrated in response to determining that the characteristics of the I/O sizes indicate that the I/O sizes are an inconsistent pattern of large I/O sizes and wherein the characteristics of the I/O sizes are determined to indicate that the extent should be not be migrated in response to determining that the characteristics of the I/O sizes indicate that the I/O sizes are a consistent pattern of the large I/O sizes.

14. A system in communication with a plurality of storage devices comprising at least one of a first storage type and a second storage type, comprising:
a processor; and
a computer readable storage medium including code executed by the processor to perform operations, the operations comprising:
processing performance information for a time period for Input/Output (I/O) operations with respect to an extent maintained in at least one of the storage devices of the first storage type, wherein the performance information indicates I/O sizes of data subject to the I/O operations with respect to the extent;
determining whether characteristics of the I/O operations other than the I/O sizes indicate that the extent is eligible for migration to at least one of the storage devices of the second storage type;
determining characteristics of the I/O sizes of the I/O operations;
determining whether the characteristics of the I/O sizes of the I/O operations indicate that the extent should be migrated from the at least one storage device of the first storage type to at least one of the storage devices of the second storage type; and
migrating the extent from one of the storage devices of the first type to at least one of the storage devices of the second type in response to determining that the extent is eligible for migration and that the characteristics of the I/O sizes indicate that the extent should be migrated.

15. The system of claim 14, wherein the determining of the characteristics of the I/O sizes is performed in response to determining that the extent is eligible for migration.

16. The system of claim 14, wherein the determined characteristics of the I/O sizes includes a mean and a standard deviation of the I/O sizes, wherein both the mean and the standard deviation are compared to a mean threshold and a standard deviation threshold to determine whether to migrate the extent from the at least one storage device of the first storage type to the at least one storage device of the second storage type.

17. The system of claim 14, wherein the second storage type is classified as having a lower latency than the first storage type, and wherein the determining of whether the characteristics of the I/O operations other than the I/O size used to determine whether the extent is eligible for migration to at least one of the storage devices of the second type comprise determining at least one of:
determining whether a frequency of the I/O operations to the extent exceeds a frequency threshold, wherein the extent is eligible for migration to at least one of the storage devices of the second type in response to determining that the frequency of the I/O operations exceeds the frequency threshold;
determining whether a ratio of random to sequential accesses to the extent exceeds an access pattern threshold, wherein the extent is eligible for migration to at least one of the storage devices of the second type in response to determining that the ratio of random to sequential accesses exceeds the access pattern threshold; and
determining whether a ratio of read and write requests to the extent exceeds a read/write ratio threshold, wherein the extent is eligible for migration to at least one of the storage devices of the second type in response to determining that the ratio of read to write requests exceeds the read/write threshold.

18. The system of claim 14, wherein the second storage type is classified as having a higher latency than the first storage type, and wherein the determining of whether the characteristics of the I/O operations other than the I/O size used to determine whether the extent is eligible for migration to at least one of the storage devices of the second type comprise determining at least one of:
- determining whether a frequency of the I/O operations to the extent exceeds a frequency threshold, wherein the extent is eligible for migration to at least one of the storage devices of the second type in response to determining that the frequency of the I/O operations is below the frequency threshold;
- determining whether a ratio of random to sequential accesses to the extent exceeds an access pattern threshold, wherein the extent is eligible for migration to at least one of the storage devices of the second type in response to determining that the ratio of random to sequential accesses is below the access pattern threshold; and
- determining whether a ratio of read and write requests to the extent exceeds a read/write ratio threshold, wherein the extent is eligible for migration to at least one of the storage devices of the second type in response to determining that the ratio of read/write requests is below the read/write threshold.

19. A method for managing data in a plurality of storage devices comprising at least one of a first storage type and a second storage type, comprising:
- processing performance information for a time period for Input/Output (I/O) operations with respect to an extent maintained in at least one of the storage devices of the first storage type, wherein the performance information indicates I/O sizes of data subject to the I/O operations with respect to the extent;
- determining whether characteristics of the I/O operations other than the I/O sizes indicate that the extent is eligible for migration to at least one of the storage devices of the second storage type;
- determining characteristics of the I/O sizes of the I/O operations; and
- determining whether the characteristics of the I/O sizes of the I/O operations indicate that the extent should be migrated from the at least one storage device of the first storage type to at least one of the storage devices of the second storage type; and
- migrating the extent from one of the storage devices of the first type to at least one of the storage devices of the second type in response in response to determining that the extent is eligible for migration and that the characteristics of the I/O sizes indicate that the extent should be migrated.

20. The method of claim 19, wherein the determining of the characteristics of the I/O sizes is performed in response to determining that the extent is eligible for migration.

21. The method of claim 19, wherein the determined characteristics of the I/O sizes includes a mean and a standard deviation of the I/O sizes, wherein both the mean and the standard deviation are compared to a mean threshold and a standard deviation threshold to determine whether to migrate the extent from the at least one storage device of the first storage type to the at least one storage device of the second storage type.

22. The method of claim 19, wherein the second storage type is classified as having a lower latency than the first storage type, and wherein the determining of whether the characteristics of the I/O operations other than the I/O size used to determine whether the extent is eligible for migration to at least one of the storage devices of the second type comprise determining at least one of:
- determining whether a frequency of the I/O operations to the extent exceeds a frequency threshold, wherein the extent is eligible for migration to at least one of the storage devices of the second type in response to determining that the frequency of the I/O operations exceeds the frequency threshold;
- determining whether a ratio of random to sequential accesses to the extent exceeds an access pattern threshold, wherein the extent is eligible for migration to at least one of the storage devices of the second type in response to determining that the ratio of random to sequential accesses exceeds the access pattern threshold; and
- determining whether a ratio of read and write requests to the extent exceeds a read/write ratio threshold, wherein the extent is eligible for migration to at least one of the storage devices of the second type in response to determining that the ratio of read to write requests exceeds the read/write threshold.

23. The method of claim 19, wherein the second storage type is classified as having a higher latency than the first storage type, and wherein the determining of whether the characteristics of the I/O operations other than the I/O size used to determine whether the extent is eligible for migration to at least one of the storage devices of the second type comprise determining at least one of:
- determining whether a frequency of the I/O operations to the extent exceeds a frequency threshold, wherein the extent is eligible for migration to at least one of the storage devices of the second type in response to determining that the frequency of the I/O operations is below the frequency threshold;
- determining whether a ratio of random to sequential accesses to the extent exceeds an access pattern threshold, wherein the extent is eligible for migration to at least one of the storage devices of the second type in response to determining that the ratio of random to sequential accesses is below the access pattern threshold; and
- determining whether a ratio of read and write requests to the extent exceeds a read/write ratio threshold, wherein the extent is eligible for migration to at least one of the storage devices of the second type in response to determining that the ratio of read/write requests is below the read/write threshold.

* * * * *